United States Patent
Tamai et al.

(10) Patent No.: US 9,308,824 B1
(45) Date of Patent: Apr. 12, 2016

(54) ACTIVE BRAKE RETRACTION DURING REGENERATION

(71) Applicant: GM GLOBAL TECHNOLOGY OPERATIONS LLC, Detroit, MI (US)

(72) Inventors: Goro Tamai, West Bloomfield, MI (US); Paul A. Stanowski, Trenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/529,385

(22) Filed: Oct. 31, 2014

(51) Int. Cl.
*B60L 9/00* (2006.01)
*B60L 7/18* (2006.01)
*F16D 65/52* (2006.01)

(52) U.S. Cl.
CPC .. *B60L 7/18* (2013.01); *F16D 65/52* (2013.01)

(58) Field of Classification Search
CPC .......................................................... B60L 7/18
See application file for complete search history.

(56) References Cited

U.S. PATENT DOCUMENTS

| | | | | |
|---|---|---|---|---|
| 3,930,191 | A * | 12/1975 | Loderer | B60L 7/003 318/376 |
| 5,318,355 | A * | 6/1994 | Asanuma | B60L 3/108 180/165 |
| 5,399,000 | A * | 3/1995 | Aoki | B60L 7/26 180/165 |
| 5,511,859 | A * | 4/1996 | Kade | B60K 6/52 188/156 |
| 5,615,933 | A * | 4/1997 | Kidston | B60L 3/102 180/65.1 |
| 6,543,565 | B1 * | 4/2003 | Phillips | B60K 6/48 180/165 |
| 8,070,647 | B2 * | 12/2011 | Heap | B60K 6/445 477/3 |
| 8,204,664 | B2 * | 6/2012 | Minarcin | B60K 6/26 180/65.21 |
| 8,433,494 | B2 * | 4/2013 | Vogel | B60W 10/06 701/1 |
| 2002/0116101 | A1 * | 8/2002 | Hashiba | B60K 6/48 701/22 |
| 2003/0184152 | A1 * | 10/2003 | Cikanek | B60K 6/48 303/152 |
| 2003/0192747 | A1 * | 10/2003 | Borugian | F16D 51/20 188/1.11 E |
| 2004/0054450 | A1 * | 3/2004 | Nakamura | B60L 7/16 701/22 |
| 2005/0104445 | A1 * | 5/2005 | Choi | B60K 6/26 303/152 |
| 2005/0143878 | A1 * | 6/2005 | Park | B60K 6/48 701/22 |
| 2005/0200197 | A1 * | 9/2005 | Crombez | B60L 7/18 303/152 |
| 2006/0102394 | A1 * | 5/2006 | Oliver | B60K 6/12 180/65.24 |
| 2010/0191400 | A1 * | 7/2010 | Ajiro | B60T 1/10 701/22 |
| 2010/0312447 | A1 * | 12/2010 | Perkins | B60L 7/18 701/71 |
| 2012/0226402 | A1 * | 9/2012 | Minamiura | B60T 1/10 701/22 |

(Continued)

*Primary Examiner* — Calvin Cheung
(74) *Attorney, Agent, or Firm* — Quinn Law Group, PLLC

(57) ABSTRACT

A method of operating a brake-retract system during a regenerative braking event begins with monitoring an amount of regenerative braking achieved. A set point threshold is linearly ramped from a first threshold to a max regeneration capacity if the amount of regenerative braking achieved exceeds a second threshold. The second threshold is less than the first threshold, and the first threshold is less than the max regeneration capacity. The max regeneration capacity is representative of a maximum amount of regenerative braking capable of being produced. A friction element is transitioned from a first, retracted-state to a second, ready-state if the amount of regenerative braking achieved exceeds the set point threshold.

19 Claims, 4 Drawing Sheets

(56) References Cited

U.S. PATENT DOCUMENTS

| | | | | |
|---|---|---|---|---|
| 2013/0138279 A1* | 5/2013 | Shi | ............................ | B60L 1/00 |
| | | | | 701/22 |
| 2013/0162009 A1* | 6/2013 | Mitts | ........................ | B60L 3/102 |
| | | | | 303/3 |
| 2013/0296100 A1* | 11/2013 | Nefcy | .................... | B60W 10/08 |
| | | | | 477/4 |
| 2014/0277983 A1* | 9/2014 | Bayar | ........................ | B60L 7/18 |
| | | | | 701/71 |
| 2015/0012197 A1* | 1/2015 | Bayar | ........................ | B60T 1/10 |
| | | | | 701/70 |
| 2015/0097512 A1* | 4/2015 | Li | ........................... | B60L 11/182 |
| | | | | 320/101 |
| 2015/0251657 A1* | 9/2015 | Johri | ........................ | B60L 7/10 |
| | | | | 701/22 |

* cited by examiner

ACTIVE BRAKE RETRACTION DURING REGENERATION

TECHNICAL FIELD

The present disclosure relates generally to a manner of controlling active brake retraction in a hybrid electric automobile.

BACKGROUND

A brake is a device that is included in automotive vehicles to inhibit motion. Brakes commonly use friction to convert kinetic energy into heat, though other methods of energy conversion may be employed. For example, regenerative braking converts much of the kinetic energy to electric energy, which may be stored for later use.

On vehicles, braking systems are employed to apply a retarding force, typically via frictional elements at the vehicle's rotating axles or wheels, to inhibit vehicle motion. Friction brakes often include stationary shoes or pads that are lined with friction material and configured to be applied against a rotating wear surface, such as a rotor or a drum. Common configurations include shoes that contact to rub on the outside of a rotating drum, commonly called a "band brake," a rotating drum with shoes that expand to rub the inside of a drum, commonly called a "drum brake," and pads that pinch a rotating disc, commonly called a "disc brake."

Another form of braking involves applying a torque that is counter to the direction of rotation of the wheel using an electric motor. In effect, the inertia of the vehicle drives the electric motor in reverse. Doing so then causes the inertial torque to drive the motor as a generator, which can regenerate the vehicle batteries, while simultaneously slowing the vehicle. As such this form of braking is often referred to as regenerative braking.

SUMMARY

A method of operating a brake-retract system during a regenerative braking event begins with monitoring an amount of regenerative braking achieved. A set point threshold is linearly ramped from a first threshold to a max regeneration capacity if the amount of regenerative braking achieved exceeds a second threshold. The second threshold is less than the first threshold, and the first threshold is less than the max regeneration capacity. The max regeneration capacity is representative of a maximum amount of regenerative braking capable of being produced.

A friction element is transitioned from a first, retracted-state to a second, ready-state if the amount of regenerative braking achieved exceeds the set point threshold. The friction elements are closer to a brake rotor in the second, ready-state than in the first, retracted-state.

In further embodiments, the method may additionally include transitioning the friction element from the first, retracted-state to the second, ready-state if a braking request is received from a separate vehicle system. Likewise, the method may include transitioning the friction element from the first, retracted-state to the second, ready-state if a vehicle speed is less than a predetermined threshold.

If the amount of regenerative braking achieved falls below the first threshold and the friction element is in the second, ready-state the set point threshold may be linearly ramped toward the first threshold. Additionally, the friction element may then be transitioned from the second, ready-state to the first, retracted-state.

The present method may be performed by a controller associated with a vehicle. The vehicle can include a vehicle traction battery, a motor/generator, a plurality of wheels, and a friction braking mechanism in communication with each of the plurality of vehicle wheels. The motor/generator is in power-flow communication with the plurality of vehicle wheels and is in electrical communication with the vehicle traction battery. The motor/generator is configured to perform regenerative braking such that a torque is received from the plurality of vehicle wheels and converted into an electrical energy that is provided to the vehicle traction battery.

Each friction braking mechanism includes a movable friction element and a rotor. The rotor is configured to rotate with the wheel, and the movable friction element is configured to selectively apply a contact pressure to the rotor. Each friction element is configured to translate between a first, retracted-state and a second, ready-state, and wherein the friction elements are closer to a brake rotor in the second, ready-state than in the first, retracted-state.

The above features and advantages and other features and advantages of the present invention are readily apparent from the following detailed description of the best modes for carrying out the invention when taken in connection with the accompanying drawings.

DETAILED DESCRIPTION

Figure 1:
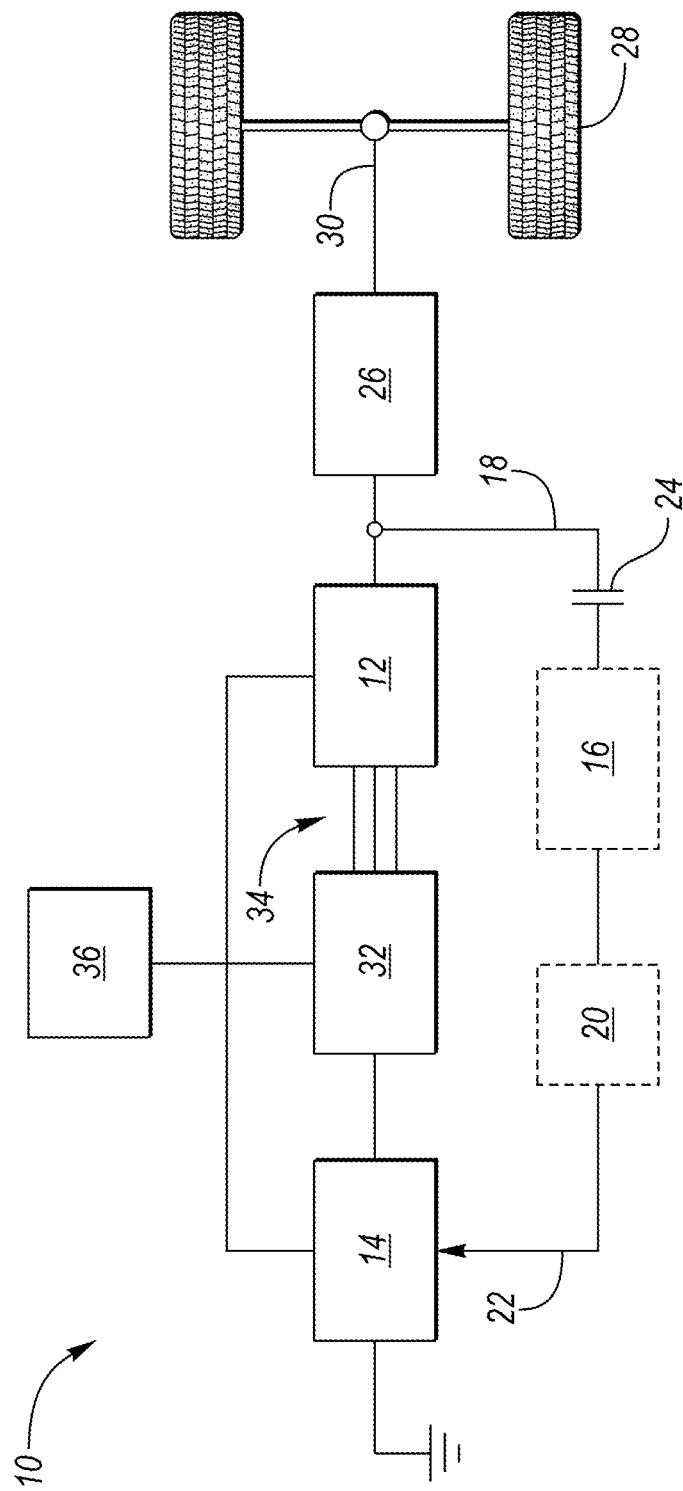
FIG. 1 is a schematic diagram of a hybrid electric vehicle.

Referring to the drawings, wherein like reference numerals are used to identify like or identical components in the various views, FIG. 1 schematically illustrates a vehicle 10, such as an automobile, that includes a motor/generator 12 and an energy storage system, such as a traction battery 14. While only one motor/generator 12 is shown for simplicity, multiple motor/generators may be used depending on the design. The vehicle 10 may be configured as a hybrid electric vehicle (HEV), a battery electric vehicle (BEV), an extended-range electric vehicle (EREV), or the like. Such vehicles can generate torque using the motor/generator 12 at levels suitable for propelling the vehicle in an electric-only (EV) mode. Alternatively, or in addition, the motor/generator 12 may operate to varying degrees with an internal combustion engine 16 for the purpose of propelling the vehicle 10. As may be appreciated, the traction battery 14 (or simply "battery 14") may include one or more battery cells of any suitable construction and/or composition. The battery 14 may be capable of discharging high voltage electrical energy as a motive power source for the vehicle 10, and storing high voltage electrical energy provided from an outside source.

In one configuration, an internal combustion engine 16, shown in phantom in FIG. 1, may be used to generate torque via an engine output shaft 18. Torque from the engine output shaft 18 can be used to either directly propel the vehicle 10, i.e., in an HEV design, or to power a generator 20, i.e., in an EREV design. The generator 20 can deliver electricity (arrow 22) to the battery 14 to recharge the battery 14. A clutch and/or damping assembly 24 may be used to selectively connect/disconnect the engine 16 from a transmission 26. Torque is ultimately transmitted from the motor/generator 12 and/or the engine 16 to a set of drive wheels 28 via an output member 30 of the transmission 26. While FIG. 1 only illustrates two drive wheels 28, it should be understood that the vehicle may have, for example, two or more drive wheels, and/or up to two or more passive, non-drive wheels. The specific power flow configuration illustrated in FIG. 1 is intended to be generally illustrative of one embodiment of a vehicle that employs electric propulsion, and should not be viewed as limiting.

The motor/generator 12 may be embodied as a multi-phase permanent magnet/AC induction machine rated for approximately 60 volts to approximately 300 volts or more depending on the vehicle design. The motor/generator 12 is electrically connected to the battery 14 via a power inverter module (PIM) 32 and a high-voltage bus bar 34. The PIM 32 is configured to convert high voltage DC power into three phase AC power and vice versa as needed. The battery 14 may be selectively recharged via the motor/generator 12 when the motor/generator is actively operating as generator 20, e.g., by capturing energy during a regenerative braking ("regen") event.

An engine control unit (ECU) 36 may be in electrical communication with each of the battery 14, PIM 32, and motor/generator 12 and may be configured to monitor and control their respective performance. The ECU 36 may be embodied as one or multiple digital computers or data processing devices, having one or more microcontrollers or central processing units (CPU), read only memory (ROM), random access memory (RAM), electrically-erasable programmable read only memory (EEPROM), a high-speed clock, analog-to-digital (A/D) circuitry, digital-to-analog (D/A) circuitry, input/output (I/O) circuitry, and/or signal conditioning and buffering electronics. In practice, the ECU 36 illustrated in FIG. 1 may be a generalized controller that may include various sub-modules such as an engine control module (ECM) hybrid control module (HCM), and/or transmission control module (TCM). The ECU 36 may be configured to automatically perform one or more control/processing routines that may be embodied as software or firmware, and may either be stored locally on the ECU 36, or may be stored in a device that is readily accessible by the ECU 36.

Figure 2:
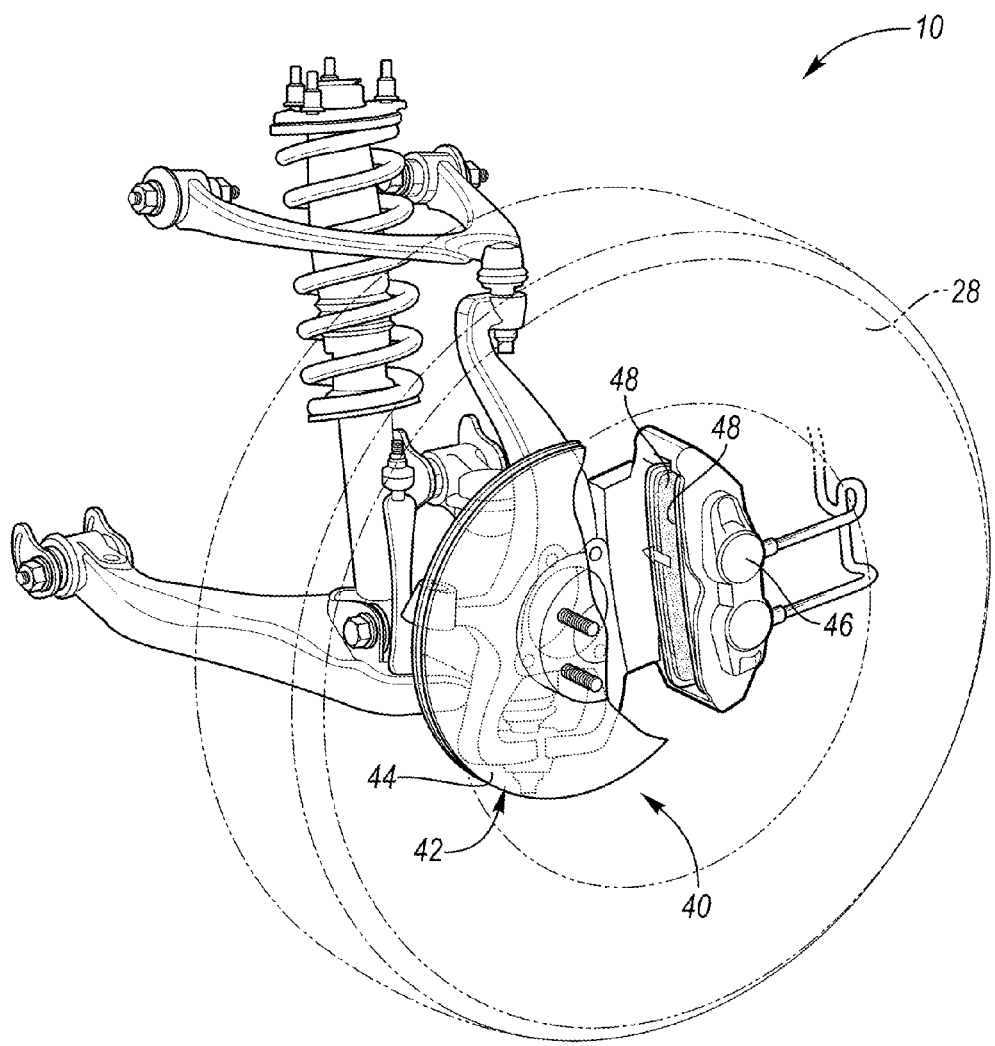
FIG. 2 is a schematic isometric view of a vehicle wheel and friction braking mechanism.

As shown in FIG. 2, the vehicle 10 may further include a vehicle braking system 40 that is in mechanical communication with two or more wheels of the vehicle and is configured to selectively decelerate the vehicle. The vehicle braking system 40 includes one or more braking mechanisms 42 disposed at each respective wheel. Each braking mechanism 42 may be configured as either a disc brake (shown in FIG. 2) or a drum brake (not shown, but understood by those skilled in the art). Each friction braking mechanism 42 includes a rotor 44 configured for synchronous rotation with the respective wheel 28, and an actuator 46 configured to translate a friction element 48, such as a brake pad, into contact with the rotor 44. In one configuration, the actuator 46 may be hydraulically actuated, such that a volume of a positively or negatively pressurized fluid acts as the basis for translating the friction element 48 and/or creating a contact pressure between the friction element 48 and the rotor 44. The actuator force is generally controlled by an operator of the vehicle 10 via an application of the brake pedal, though it may also be controlled by an electronic brake controller.

During operation, the braking system 40 may be configured to operate in one of three states: brake-apply; brake-un-apply; and brake-retract. Brake-apply is the situation where the friction elements 48 are increasing pressure against the rotor 44 to increase the friction force, and decelerate the vehicle. Conversely, brake-un-apply is the situation where the friction elements 48 are decreasing pressure against the rotor 44, thus resulting in a decreasing friction force. Brake-apply is most commonly experienced when a user is applying pressure to a brake pedal, and brake-un-apply results when the user releases pressure from the brake pedal.

To decrease the braking response time while waiting for a brake-apply condition, even when the brake pedal is not pressed by the user, the friction elements 48 (i.e., "brake pads 48") are typically positioned in close proximity and/or in light contact with the brake rotor 44. While this positioning decreases brake response time, it may also result in an incidental frictional force being created against the rotor 44 (often referred to as driveline drag). During the brake-retract state, the brake pads 48 are configured to lift off the rotor 44 to a more distant position. Said another way, during the brake retract state, the brake pads 48 translate from a first position in contact with the brake rotor 44 to a second position that is more distant from the brake rotor 44. In doing so, the braking system 40 reduces the rolling resistance of the vehicle that is attributable to the brake pads 48. In a hydraulically actuated system, the brake pads 48 are generally maintained in the first position (i.e., including brake-apply and brake-un-apply states) by supplying positively pressurized fluid to the actuator 50. Conversely, in such a system, the brake pads 48 are maintained in the second position by supplying a negatively pressurized fluid to the actuator 46.

In one configuration, the brake-retract state may be initiated under the direction of the ECU 36 during regenerative braking in an effort to maximize the potential energy capture during the regenerative braking ("regen") event (i.e., where the motor/generator 12 is driven as a generator to both slow the vehicle and recharge the battery 14). As such, during regenerative braking, the ECU 36 is configured to execute a corresponding regen brake-retract algorithm 80, such as shown in FIG. 3.

Figure 3:
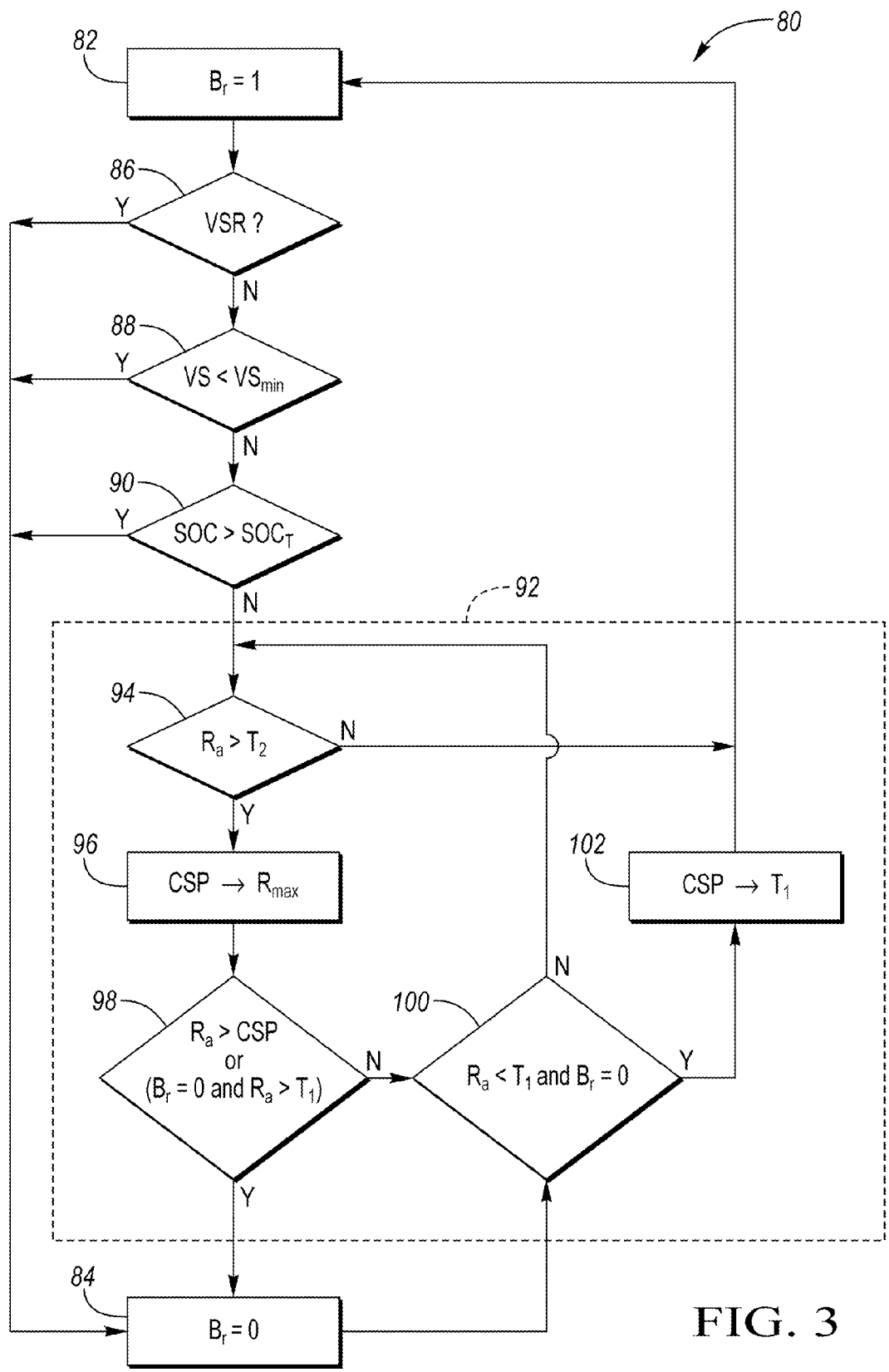
FIG. 3 is a schematic flow diagram of a regenerative braking brake-retract algorithm.

Referring to FIG. 3, the algorithm 80 begins at 82 with the brake pads 48 in a retracted state ($B_r=1$). The algorithm 80 assumes that brake retraction ($B_r$) is desirable under most driving situations to reduce driveline drag, unless it determines otherwise and disables brake retraction at 84 ($B_r=0$). "Disabling" the brake retraction at 84 involves transitioning the brake pads 48 from the retracted, more distant position from the rotor 44, back to the position that is more proximate to and/or in contact with the rotor 44.

The algorithm 80 may begin by determining at 86 if brake retraction should be disabled at the request of a separate vehicle system. Said another way, if another vehicle system indicates that it may require the use of friction brakes, the ECU 36 may prevent the brakes from being retracted. Examples of vehicle system requests (VSR) that may disable the brake retraction include requests from antilock braking systems, vehicle stability control systems, and communication systems (i.e., in the event of a fault code). While this determination is shown as a discrete step, it may also operate as an interrupt, where an appropriate interrupt handler can override other aspects of the algorithm to disable brake retraction.

Brake retraction may also be disabled at 88 if the vehicle speed (VS) falls below a threshold vehicle speed where regeneration becomes unavailable ($VS_{min}$). In one example, this threshold vehicle speed may be about 2.0 mph. Furthermore, at 90, brake retraction may be disabled at 86 if the state of charge (SOC) of the battery 14 is over a particular threshold ($SOC_T$) where further charging would negatively affect battery performance. Said another way, brake retraction may be disabled at 84 if the SOC of the battery 14 is within a particular tolerance of a maximum SOC.

The algorithm 80 may be further configured to determine if brake retraction should be disabled according to the amount of regenerative braking that is actually being achieved at 92. The disablement scheme shown at 92 may be best illustrated with reference to a regenerative braking graph 120, shown in FIG. 4. This graph 120 generally illustrates instantaneous regen with respect to time (t) 122, as well as the brake retraction state ($B_r$) 124 with respect to time 122. As shown, instantaneous regen can be measured as a regen-torque 126 ($\tau$) that is received by the motor/generator 12. For the purpose of this description, the sign of the regen-torque 126 ($\tau$) is viewed from the point of view of the motor/generator 12, where a positive regen-torque 126 is torque received by the motor/generator 12 and converted into stored energy. Correspondingly, a negative regen-torque would be a torque that is generated by the motor/generator 12 (i.e. acting as a motor) from the stored energy. In practice, this torque may be an instantaneous measurement (or computed value) at the motor output shaft, at an output shaft of a mechanically linked transmission, or at other such places along the driveline.

As mentioned above, the brake retraction state 124 has two states: a first state 128 ($B_r$=0), where the brake pads 48 are positioned proximate to/in contact with the brake rotor 44; and a second state 130 ($B_r$=1), where the brake pads 48 are retracted/more distant from the brake rotor 44 (i.e., $B_r$=1 corresponds to brake-retract-enabled, and $B_r$=0 corresponds to brake-retract-disabled).

On the regen graph 120, regen-achieved ($R_a$) 132 illustrates the instantaneous amount of regen-torque 126 converted by the motor/generator 12, and max-regen ($R_{max}$) 134 is the maximum torque-absorbing capacity of the regenerative braking system. $R_{max}$ 134 may vary according to various operating parameters of the vehicle, but ultimately represents the maximum amount of regen-torque 126 that is capable of being absorbed/converted by the motor/generator 12 at a given instant.

The graph 120 further illustrates a first threshold ($T_1$) 136 and a second threshold ($T_2$) 138, where ($T_1$) 136 is less than $R_{max}$ 134 by a first offset 140, and ($T_2$) 138 is less than ($T_1$) 136 by a second offset 142. Additionally, the graph 120 illustrates a Controller Set Point (CSP) 144 that may vary between ($T_1$) 136 and ($R_{max}$) 134.

The graph 120 generally illustrates a regenerative braking event, where all, or nearly all of the vehicle braking torque is being supplied by the motor/generator 12. The graph 120 illustrates a first period of time 150 where a regenerative vehicle braking force is increasing (i.e., regen-achieved ($R_a$) 132 is increasing), and a second period of time 152 where a regenerative vehicle braking force is decreasing (i.e., regen-achieved ($R_a$) 132 is decreasing). These periods of time 150, 152 may correspond to, for example, a user applying an increasing amount of pressure to a brake pedal (in period 150), and subsequently decreasing the amount of pressure to the brake pedal (in period 152). In this example, because regen-achieved ($R_a$) 132 is still less than $R_{max}$ 134, the motor/generator 12 is fully capable of supplying the entirety of the requested vehicle braking torque, and even if readied, the friction brakes may not be actively engaged.

With reference to FIG. 3, the disablement scheme 92 may begin by determining at 94 if the regen-achieved ($R_a$) 132 torque exceeds $T_2$ 138. This second threshold $T_2$ 138 may serve as an advanced warning/warning-track of a braking event that is nearing the capacity of the regenerative braking system ($R_{max}$) 134. If $R_a$<$T_2$, the brake pads 48 may remain in a retracted state at 82. If $R_a$>$T_2$, such as at 154 in FIG. 4, the Controller Set Point (CSP) 144 may begin linearly ramping at 96 from $T_1$ 136 toward $R_{max}$ 134 (shown graphically at 156 in FIG. 4).

Figure 4:
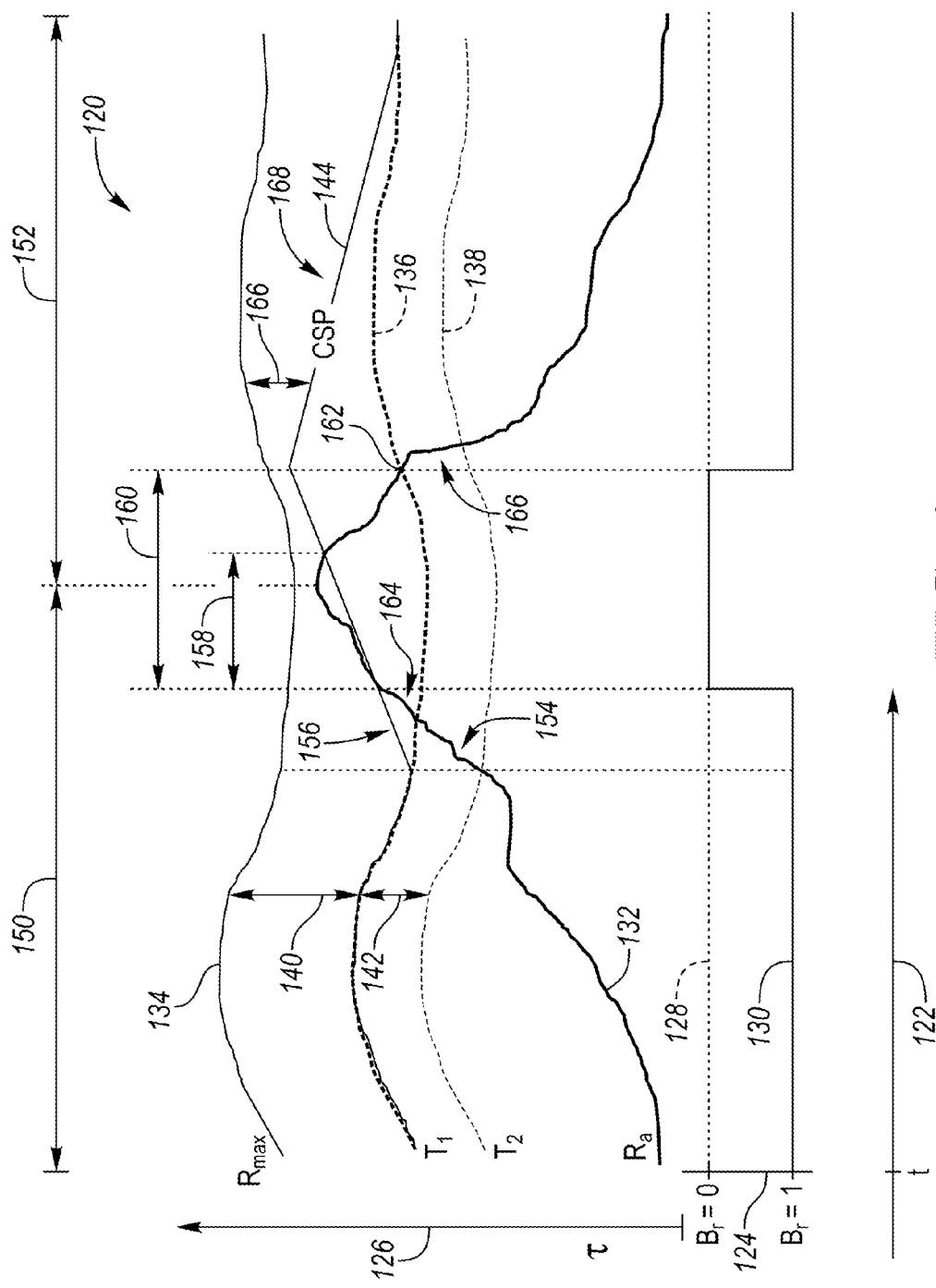
FIG. 4 is a schematic illustration of a regenerative braking graph including a brake-retract state.

At 98, the algorithm 80 may determine if either $R_a$ 132 is greater than CSP 144, or if the brake retract is disabled ($B_r$=0) (i.e., the brake pads are positioned adjacent to the rotors) and $R_a$ 132 is greater than $T_1$ 136. If either condition answers in the affirmative then brake retraction should be disabled at 84. Referring to FIG. 4, the first condition ($R_a$ 132 is greater than CSP 144) occurs in the time period shown at 158, and the second condition (brakes are in the first state 128 ($B_r$=0) and $R_a$ 132 is greater than $T_1$ 136) occurs in the time period shown at 160 (i.e., until $T_1$ 136 is crossed).

If neither condition at 98 answers in the affirmative, then the algorithm 80 then inquires at 100 whether brake retraction is disabled ($B_r$=0) and $R_a$ 132 is less than $T_1$ 136, such as at 162. If either condition is not true, then the algorithm 80 continues monitoring at 94 to determine if $R_a$ 132 is still greater than $T_2$ 138. If it is, CSP 144 continues to ramp at 96, such as at 164. If, however, brake retraction is disabled and $R_a$ 132 is less than $T_1$ 136 (such as at 166), then the algorithm 80 causes CSP 144 to begin linearly ramping (at 102) toward $T_1$ 136 (such as at 168), and causes the brakes to retract away from the rotors 44 ($B_r$=1) at 84.

In operation, CSP 144 serves as the trigger to cause the brakes to transition into a ready-state against the rotors 44. Because it takes a certain amount of time to effectuate the transition, the brakes should begin to transition earlier under an aggressive braking condition than under a smoother braking condition. Said another way, CSP 144 may be spaced from $R_{max}$ 134 by a given regen-capacity buffer. This buffer may remain at certain size until $R_a$ 132 exceeds the second "warning track" threshold $T_2$ 138, at which point it may begin decreasing toward zero. In an aggressive braking condition, where $R_a$ 132 is increasing rapidly, it is more likely that $R_a$ 132 will exceed CSP 144 when the buffer is at or near its largest size. This will provide the brakes with advanced notice to move toward the rotors 44 prior to maxing out the regen braking torque at $R_{max}$ 134. In a comparatively less aggressive braking condition (i.e., where $R_a$ 132 is increasing with a smaller slope), it is more likely that $R_a$ 132 will exceed CSP 144 when the buffer is at a comparatively smaller size. This, however, would likely still provide sufficient time for the brakes to transition, as the slope of $R_a$ 132 is smaller.

While the best modes for carrying out the invention have been described in detail, those familiar with the art to which this invention relates will recognize various alternative designs and embodiments for practicing the invention within the scope of the appended claims. It is intended that all matter contained in the above description or shown in the accompanying drawings shall be interpreted as illustrative only and not as limiting.

The invention claimed is:
1. A method of operating a brake-retract system during a regenerative braking event comprising:
monitoring an amount of regenerative braking achieved;
linearly ramping a set point threshold from a first threshold to a max regeneration capacity if the amount of regenerative braking achieved exceeds a second threshold;
wherein the second threshold is less than the first threshold, wherein the first threshold is less than the max regeneration capacity, and wherein the max regeneration capacity is representative of a maximum amount of regenerative braking capable of being produced;

transitioning a friction element of a braking mechanism from a first, retracted-state to a second, ready-state if the amount of regenerative braking achieved exceeds the set point threshold; and wherein the friction elements are closer to a brake rotor in the second, ready-state than in the first, retracted-state.

2. The method of claim 1, further comprising transitioning the friction element from the first, retracted-state to the second, ready-state if a braking request is received from a vehicle system.

3. The method of claim 1, further comprising transitioning the friction element from the first, retracted-state to the second, ready-state if a vehicle speed is less than a predetermined threshold.

4. The method of claim 1, further comprising linearly ramping the set point threshold toward the first threshold if the amount of regenerative braking achieved falls below the first threshold and the friction element is in the second, ready-state.

5. The method of claim 4, further comprising transitioning the friction element from the second, ready-state to the first, retracted-state if the amount of regenerative braking achieved falls below the first threshold and the friction element is in the second, ready-state.

6. The method of claim 1, further comprising transitioning the friction element from the first, retracted-state to the second, ready-state if a state of charge of a vehicle traction battery is within a predefined tolerance of a maximum state of charge.

7. The method of claim 1, wherein the set point threshold, the first threshold, the second threshold, and the max regeneration capacity are all torque values measured from the point of view of a motor/generator disposed in power flow communication with a plurality of wheels of a vehicle.

8. A vehicle comprising:
a vehicle traction battery;
a motor/generator in power-flow communication with a plurality of vehicle wheels and in electrical communication with the vehicle traction battery, wherein the motor/generator is configured to perform regenerative braking such that a torque is received from the plurality of vehicle wheels and converted into an electrical energy that is provided to the vehicle traction battery;
a friction braking mechanism in communication with each of the plurality of vehicle wheels, each respective friction braking mechanism including a movable friction element and a rotor, wherein the rotor is configured to rotate with the wheel, and wherein the movable friction element is configured to selectively apply a contact pressure to the rotor;
wherein each friction element is configured to translate between a first, retracted-state and a second, ready-state, and wherein the friction elements are closer to a brake rotor in the second, ready-state than in the first, retracted-state; and
a controller configured to:
monitor an amount of regenerative braking achieved by the motor/generator;
linearly ramp a set point threshold from a first threshold to a max regeneration capacity if the amount of regenerative braking achieved exceeds a second threshold; wherein the second threshold is less than the first threshold, wherein the first threshold is less than the max regeneration capacity, and wherein the max regeneration capacity is representative of a maximum amount of regenerative braking capable of being produced;

transition each respective friction element from the first, retracted-state to the second, ready-state if the amount of regenerative braking achieved exceeds the set point threshold.

9. The vehicle of claim 8, wherein the controller is further configured to transition each respective friction element from the first, retracted-state to the second, ready-state if a braking request is received from a vehicle system.

10. The vehicle of claim 8, wherein the controller is further configured to transition each respective friction element from the first, retracted-state to the second, ready-state if a vehicle speed is less than a predetermined threshold.

11. The vehicle of claim 8, wherein the controller is further configured to linearly ramp the set point threshold toward the first threshold if the amount of regenerative braking achieved falls below the first threshold and the friction element is in the second, ready-state.

12. The vehicle of claim 8, wherein the controller is further configured to transition each respective friction element from the second, ready-state to the first, retracted-state if the amount of regenerative braking achieved falls below the first threshold and each respective friction element is in the second, ready-state.

13. The vehicle of claim 8, wherein the controller is further configured to transition each respective friction element from the first, retracted-state to the second, ready-state if a state of charge of the vehicle traction battery is within a predefined tolerance of a maximum state of charge.

14. The vehicle of claim 8, wherein the set point threshold, the first threshold, the second threshold, and the max regeneration capacity are all torque values measured from the point of view of a motor/generator.

15. A method of operating a brake-retract system during a regenerative braking event comprising:
monitoring an amount of regenerative braking achieved;
linearly ramping a set point threshold from a first threshold to a max regeneration capacity if the amount of regenerative braking achieved exceeds a second threshold; wherein the second threshold is less than the first threshold, wherein the first threshold is less than the max regeneration capacity, and wherein the max regeneration capacity is representative of a maximum amount of regenerative braking capable of being produced;
transitioning a friction element of a braking mechanism from a first, retracted-state to a second, ready-state if the amount of regenerative braking achieved exceeds the set point threshold; and
transitioning the friction element from the first, retracted-state to the second, ready-state if a braking request is received from a vehicle system
transitioning the friction element from the first, retracted-state to the second, ready-state if a vehicle speed is less than a predetermined threshold
wherein the friction elements are closer to a brake rotor in the second, ready-state than in the first, retracted-state.

16. The method of claim 15, further comprising linearly ramping the set point threshold toward the first threshold if the amount of regenerative braking achieved falls below the first threshold and the friction element is in the second, ready-state.

17. The method of claim 16, further comprising transitioning the friction element from the second, ready-state to the first, retracted-state if the amount of regenerative braking achieved falls below the first threshold and the friction element is in the second, ready-state.

18. The method of claim 15, further comprising transitioning the friction element from the first, retracted-state to the second, ready-state if a state of charge of a vehicle traction battery is within a predefined tolerance of a maximum state of charge.

19. The method of claim 15, wherein the set point threshold, the first threshold, the second threshold, and the max regeneration capacity are all torque values measured from the point of view of a motor/generator disposed in power flow communication with a plurality of wheels of a vehicle.

* * * * *